Figure 1:
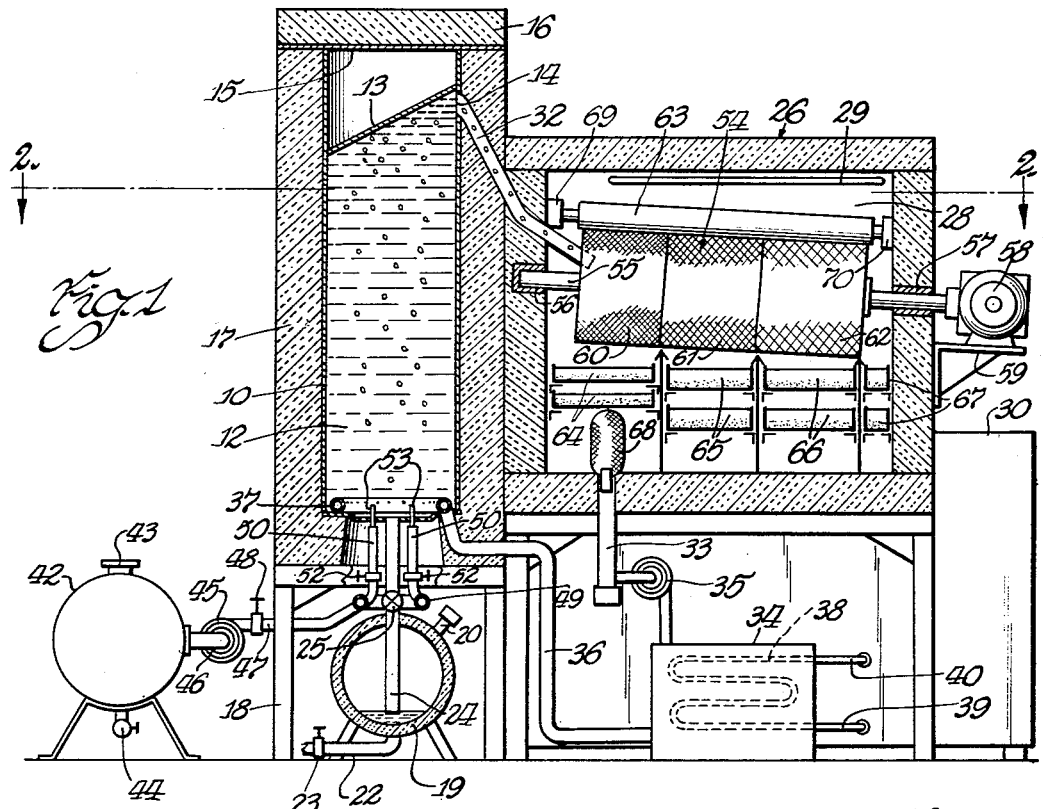

June 26, 1956  R. F. COLTON  2,751,762
METHOD OF FREEZING MATERIALS
Filed Aug. 8, 1952

Inventor
Ralph F. Colton
by H. Thrall Brewer
Atty.

United States Patent Office 2,751,762
Patented June 26, 1956

2,751,762
METHOD OF FREEZING MATERIALS

Ralph F. Colton, Chicago, Ill., assignor to Proctor Drying and Freezing Corporation, Philadelphia, Pa., a corporation of Illinois Application August 8, 1952, Serial No. 303,326

4 Claims. (Cl. 62—173)

This invention relates to a method of freezing materials, and more particularly to a method adapted for effecting efficient and very rapid freezing of materials, and wherein certain variations and controls are utilized to suit the method to the characteristics of the material.

One of the more general objects of my invention is to provide a method affording improved efficiency in effecting very rapid freezing of materials including liquids, so as to produce frozen pellets or particles of the material.

As another object, my invention has within its purview the provision of a method affording variations and controls whereby a wide variety of materials having different charcateristics can be frozen completely and efficiently in pellet form in a relatively small space.

My invention comprehends the provision of an efficient and effective method for accomplishing the freezing of materials in a manner to prepare such materials for convenient handling in a subsequent freeze-drying operation.

I have provided, in this invention, a mehod by which frozen pellets or particles of relatively uniform or graded size can be economically produced from a liquid material.

This invention further comprehends, as an object, the provision of a method by which a liquid material may be frozen in pellet form by injection of the material under pressure into a frigid liquid which is immiscible with the material, the injection taking place at one location, and effecting movement of the resulting freezing bodies in said frigid liquid away from said location of injection.

As a corollary to the foregoing object, my invention has within its purview the provision of a method and materials for freezing liquid material by direct contact with a frigid liquid and so that the average size and general shape of the frozen particles of liquid material are subject to control by regulation of the specific gravity of the frigid liquid in relation to that of the liquid material and by selection of the position and pressure at which the liquid material is introduced into the frigid liquid.

My invention contemplates the provision of a method suited to the freezing of liquid and other materials in a continuing operation.

From the standpoint of utility and scope of use, my invention provides a method adapted to the rapid freezing of a large variety of materials, including food products, biologicals, pharmaceuticals, chemicals, water dispersible plastics, and the like.

As a further object, my invention comprehends the provision of a method of freezing materials by direct contact with a frigid liquid, which frigid liquid is in motion, and by which method the rate of movement of the material in the frigid liquid is controlled by both the rate of motion of the frigid liquid and the relative specific gravities of the material and the frigid liquid.

Other objects and advantages of the invention will be apparent from the following description and the accompanying drawings in which similar characters of reference indicate similar parts throughout the several views.

Figure 2:
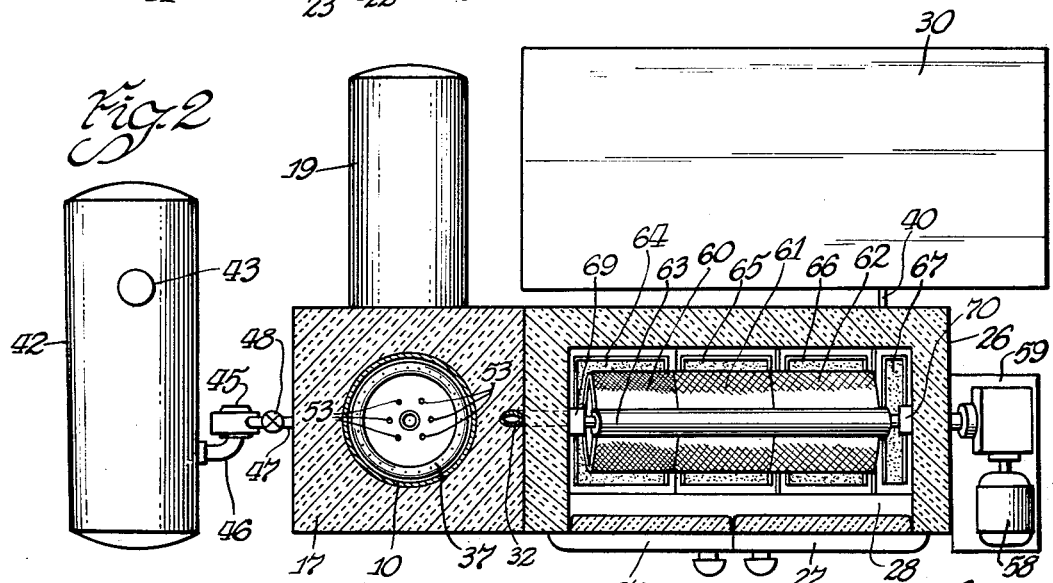

Referring to the single sheet of drawings:

Fig. 1 is a vertical sectional view in somewhat diagrammatic form and showing the structure and arrangement of one form of apparatus adapted to use in the practice of my preferred method embodied in this invention; and Fig. 2 is a horizontal section taken substantially at the position of line 2—2 in Fig. 1 and viewed in the direction indicated by accompanying arrows.

In the accompanying drawings, and for illustrative purposes, I have illustrated one form of apparatus which is adapted to use for practicing a preferred embodiment of my method of freezing materials, as disclosed herein, and which apparatus may aid in the visualization of the method steps as they are described.

In the disclosed apparatus, I have provided a container 10 which may be made of metal and which is adapted to carry a column of frigid liquid 12, which frigid liquid and its characteristics and preferred constituents will be more fully discussed. The container 10, in the disclosed apparatus, has a baffle plate 13 therein at a position near the top and disposed so as to slope upwardly toward an outlet port 14 in the side wall of the container. A cover 15 is provided at the top of the container, and both the cover and container side walls are heat insulated by outer insulating wall coverings 16 and 17.

At the bottom, the insulated container is supported by a suitable stand or base 18, below which stand a reservoir 19 is mounted for the storage of the frigid liquid. Preferably, the capacity of the reservoir 19 is such that the frigid liquid contents of the container 10 can be drained thereto when not in use. It is also desirable that after the initial filling of the container 10, the reservoir 19 shall contain a supply of the frigid liquid for replenishing or replacing any that may be lost or used while the apparatus is in service. In the disclosed apparatus, the reservoir 19 has a capped filler spout 20 and is provided with a pipe 22 equipped with a valve 23, through which air may be introduced under pressure into the interior of the reservoir to force the liquid from the reservoir upwardly through a conduit 24 and into the bottom of the container 10. A valve 25 is provided in the conduit 24 between the the reservoir 19 and the container 10 for preventing communication between the container and reservoir while the apparatus is in normal use.

My disclosed apparatus embodies a heat insulated housing 26 adjacent one side of the insulating wall of the container 10, which heat insulated housing 26 includes doors 27 in the front thereof, and defines a refrigerated chamber 28. The refrigerated chamber 28 is kept at or below a prescribed operating temperature by a condenser unit 29 mounted therein and connected to a refrigeration unit 30 which may be of a relatively conventional type.

The outlet port 14 of the container 10 is connected to the interior of the refrigerated chamber 28 through a conduit 32 which, in the present instance, slopes downwardly from the outlet port of the container to a position within the refrigerated chamber, in order to facilitate the flow of material therethrough from the container 10 to the chamber 28. At the bottom of the refrigerated chamber, an outlet conduit 33 is provided for the flow of liquid from that chamber to a refrigerated chilling tank 34 through a pump 35. From the chilling tank 34, the chilled liquid is forced back into the container 10 through a connecting conduit 36 and a perforated distributing ring 37, which is mounted internally of the container. Refrigeration for the chilling tank is provided by an evaporator unit 38 mounted internally of the chilling tank and connected to the refrigeration unit 30 through inlet and outlet conduits 39 and 40.

Since my disclosed method and illustrated apparatus are adapted to the freezing of liquid materials in pellet or particle form, and by direct contact of the liquid material which is to be frozen with the frigid liquid within the container 10, I have provided a supply tank 42 at one side of the container 10 for holding a supply of the liquid which is to be frozen. This supply tank 42 is equipped with a capped filler spout 43 at the top and a drain cock 44 at the bottom. Additionally, the supply tank 42 communicates with a pump 45 through an outlet conduit 46, and the pump discharges liquid under pressure through a conduit 47 which contains a shut-off valve 48. At the end of the conduit 47 opposite the pump 45, a distributing ring 49 is connected thereto and has a plurality of nozzles 50 communicating therewith. The nozzles 50, in the present instance, are equipped with individual shut-off valves 52 and have tips 53 thereon which project through the bottom of the container 10 and into the frigid liquid 12 for the injection of liquid material under pressure into the frigid liquid for freezing. By injecting the liquid which is to be frozen into the frigid liquid at a suitable pressure, the liquid which is to be frozen is broken into particles or pellets, which particles or pellets freeze inwardly from their outer surfaces.

It may be readily understood that since the liquid material which is to be frozen is injected into the frigid liquid at the bottom of the container 10 and is adapted to be discharged therefrom in a solid frozen state through the discharge port 14 at the top of the container 10, the disclosed apparatus is adapted to the use of a liquid refrigerant or frigid liquid which has a specific gravity higher than that of the liquid to be frozen, at the operating temperature of the frigid liquid, so that the particles or pellets formed float upwardly through the frigid liquid toward the discharge port. The sloping baffle at the top of the container 10 tends to guide the particles toward the discharge port and avoids the collection of particles or pellets at a position remote from the discharge port. It is also a feature of the disclosed apparatus and of my method that the rate of movement of the particles or pellets away from the place of injection in the container 10 may be controlled either by a difference in the specific gravity of the frigid liquid from that of the liquid to be frozen, or by the velocity of flow of the frigid liquid through the container 10 and the chilling tank 34, or by both together.

In the disclosed apparatus, the frozen particles or pellets are removed or separated from the frigid liquid by mechanism contained within the refrigerated chamber 28. As depicted, the mixed pellets or particles of frozen material and frigid liquid flow from the conduit 32 into a cylindrical sieve 54 which is carried for rotational movement by a shaft 55 journaled at opposite ends of the heat insulated housing 26 in bearings 56; the shaft 55 being driven by a motor 57 carried on a bracket 59 at the exterior of the housing. The cylindrical sieve 54, as disclosed, includes axially adjacent sections 60, 61 and 62 of different mesh size for the purpose of grading the pellets or particles as to size. The section 60, into which the mixed particles or pellets and the frigid liquid initially flow, is made of a selected fine mesh screen. The next adjacent section 61 is made of a selected medium mesh screen, and the final section 62 is made of a selected coarse mesh screen. Any particles which do not pass through one of the screens are discharged from the ends of the sieve opposite the conduit 32. To aid in the flow of material across the respective sections of the sieve, the axis of the shaft 55 and the cylindrical sieve slopes downwardly away from the conduit 32. Also, in order to prevent pellets or particles from being lodged in one of the screens, the outer surface of the cylindrical sieve is engaged at the top by a roller 63, which roller extend along the surfaces of the sections and is journaled for rotation at its opposite ends in bearing blocks 69 and 70 mounted on the end walls of the housing 26.

Below the sections 60, 61 and 62 of the cylindrical sieve, I have provided removable perforated trays 64, 65 and 66 respectively, in which the graded particles are gathered and stored until they are utilized, as for dry-freezing purposes. The oversize pellets or particles which flow from the end of the sieve are gathered in removable perforated trays 67. In order to prevent any particles or pellets which may inadvertently be spilled from the gathering trays from flowing from the refrigerated chamber with the frigid liquid, a sieve 68 is mounted on the end of the outlet conduit 33 in the bottom of the refrigerated chamber.

It may be readily understood that the disclosed apparatus and other features of my method and materials, as disclosed herein, are suited to the very rapid freezing of liquid materials into substantially solid pellet or particle form, as well as to continuous freezing and grading operations. For use in the disclosed apparatus and in modified versions of my disclosed method, the frigid liquid 12 should have certain definable characteristics, which are as follows:

(1) The frigid liquid should be one having an appreciable change of density with changes of temperature; i. e., a high density coefficient.

(2) The freezing point of the liquid, for effecting very rapid or substantially instantaneous freezing of most ordinary liquid materials, should be lower than $-30°$ C., and preferably lower than $-40°$ C.

(3) The viscosity of the liquid should be low, so that the fluidity thereof remains high at temperatures between $-30°$ C. and $-50°$ C.

(4) The liquid should be volatile.

(5) It is a very desirable characteristic, that the frigid liquid should be non-inflammable.

(6) The frigid liquid should be non-corrosive.

(7) It should leave no appreciable odor or taste when volatilized.

(8) For the freezing of materials which are to be thereafter freeze-dried, the frigid liquid should have no appreciable solubility in or with water at low temperatures.

(9) The vapor pressure of the frigid liquid should be less than 400 mm. of mercury at 20° C.

(10) The cost of the frigid liquid should be relatively low, in order to make it practical for commercial or quantity use.

In addition to the foregoing characteristics, and in order to adapt the material particularly to use in my preferred method and for the rapid freezing of various materials or types of materials in the disclosed or modified versions of the illustrated apparatus, the frigid liquid should be one which is made by the mixture or combination of components, which components may be controlled or varied in quantity, so as to permit the selection or adjustment of the specific gravity of the resultant frigid liquid at the temprature at which it is to be utilized for freezing purposes. For the accomplishment of this result, I have utilized, as an operative frigid liquid, a combination of liquid materials, one of which has a specific gravity considerably less than 1. (Light component), and a material which has a specific gravity considerably greater than 1 (heavy component). More specifically, I have utilized as a heavy component a halogenated hydrocarbon, and as a light component, a hydrocarbon. Examples of the halogenated hydrocarbon utilized as the heavy component are (a) trifluorotrichloroethylene and (b) carbon tetrachloride. Examples of the hydrocarbons adapted to use as the light components are (a) normal heptane, (b) iso-octane and (c) hexane. Additional examples of materials adapted to use as the light component of the frigid liquid are the higher molecular weight hydrocarbons, such as mineral spirits or lower freezing point oils, for example, sweet mineral spirits (deodorized kerosene) may be used.

In the practice of my preferred method of freezing, there are three related, but somewhat different ways of controlling the freezing operation and the time required for passage of the material, which is being frozen through the frigid liquid. They are:

(1) Introducing the liquid to be frozen into the frigid liquid at or near the bottom of a column of such frigid liquid, and having the specific gravity of the liquid so related to the specific gravity of the liquid being frozen that the material being frozen floats upwardly in the frigid liquid at the operating temperature of the frigid liquid and at a rate such that the material being frozen reaches a solid state by the time it gets to the top of the column.

(2) Introducing the material to be frozen into a column of frigid liquid at or near the top of the column and having the specific gravity of the frigid liquid so related to that of the material being frozen that the material being frozen will move downwardly through the frigid liquid and become completely frozen therein by the time it gets to a prescribed position for separation.

(3) Selecting the specific gravity of the frigid liquid in relationship to the specific gravity of the material being frozen so as to produce either normal upward or normal downward movement of the material being frozen, as a result of gravitational or buoyancy force, and altering the normal direction or rate of movement of the material being frozen in the frigid liquid by mechanically effecting a flow of the frigid liquid in a direction and at a rate which changes the movements produced by the gravitational or buoyancy force.

When there is no appreciable effect derived as a result of the flow of the frigid liquid, I prefer to have the specific gravity of the frigid liquid preselected so that at the normal operating temperature of the frigid liquid, the difference in the specific gravity of the frigid liquid from that of the material being frozen is between 2% and 10% of the specific gravity of the frigid liquid. When the flow of the frigid liquid is utilized to produce movement of the particles away from the location of injection, the difference of their specific gravities may be zero, or the specific gravity of the frigid liquid may be as much as 5% below that of the liquid material at the temperature of use of the frigid liquid.

My disclosed method, as indicated in the discussion of the exemplary apparatus, comprehends the injecton of liquid material which is to be frozen into the frigid liquid through nozzles or needles, such as 53 in the drawings, which nozzles or needles may, for example, have an internal diameter between .023 inch and .070 inch for most materials. The pressure at which the material is injected into the frigid liquid through the nozzles has a definite effect upon the size of the particles or pellets produced. That is, the lower the injection pressure, the larger the pellets will be. The injection pressures for most materials may be varied between two pounds per square inch and 10 pounds per square inch. The pressure of the injection of liquid material into the frigid liquid also has an effect upon the shape of the particles or pellets which are produced. When the injection pressure and the needle size have been determined for producing pellets or particles of a generally desired shape and size, the specific gravity of the frigid liquid is predetermined with respect to that of the material being frozen at the operating temperature of the frigid liquid, so that the movement of the pellets or particles through the frigid liquid results in the complete freezing of the particles or pellets to a solid state. Since the particles or pellets freeze inwardly from their outer surfaces, the larger pellets or particles require more freezing time than the smaller particles or pellets. As a specific example of my disclosed method and the use of materials which have been discussed, I have frozen coffee extract in particle or pellet form in a frigid liquid composed of trifluorotrichloroethylene and normal heptane at −35° C. by injecting the coffee extract into the frigid liquid through a nozzle having an internal diameter of .055 inch, and utilizing an operating pressure of approximately four pounds per square inch for injecting the coffee extract into the frigid liquid in apparatus comparable to that depicted in the drawings. The coffee extract utilized had a specific gravity of approximately 1.14 at room temperature. The specific gravity of coffee extract does not vary appreciably as the temperature is reduced. The trifluorotrichloroethylene has a specific gravity of approximately 1.6 at room temperature. The normal heptane has a specific gravity of approximately .68 at room temperature. The frigid liquid utilized for freezing the coffee extract was produced by mixing approximately 47.5% normal heptane and 52.5% trifluorotrichloroethylene, and was found to have a specific gravity of approximately 1.05 at room temperature and 1.2 at the operating temperature of −35° C. Thus, at the operating temperature of −35° C., the difference in the specific gravity of the frigid liquid and that of the coffee extract was sufficient to cause the pellets or particles of coffee extract to rise by gravitational force through the frigid liquid and become completely frozen to a solid state in a column of the frigid liquid which was approximately four feet high.

It has been observed, in addition to the foregoing general and more specific details of my method and the results produced thereby, that for a given pressure of injection of liquid material into the frigid liquid, the pellets or particles are rounder in their resultant outer contours when the specific gravity of the frigid liquid closely approaches that of the liquid material being frozen. As the difference of the specific gravity of the frigid liquid from that of the material being frozen increases, or as the rate of movement of the material particles through the frigid liquid increases, the tendency is to flatten the contours of the frozen pellets or particles, and even to produce convex tops and bottoms on the flattened particles or pellets. It has also been observed that for a given injection pressure, the pellets or particles formed are generally larger in size as the specific gravity of the frigid liquid aproaches more closely to that of the liquid being frozen.

From the foregoing description of my method of freezing materials by direct contact with the frigid liquid and by consideration of the steps of the method and the materials utilized in connection wtih the apparatus disclosed for exemplary purposes, it may be readily understood that I have provided an effective and efficient freezing method, together with practical materials for carrying out the steps of my method in applications to a wide variety of materials and types of materials.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. The method of freezing material by direct contact with a frigid liquid with which the material is immiscible and in a limited space which comprises the steps of feeding the material into a column of frigid liquid having a specific gravity at the normal operating temperature of the frigid liquid which differs from that of the material by a preselected amount between three percent and ten percent of the specific gravity of the frigid liquid, allowing the material to move through the frigid liquid by virtue of the aforesaid difference of specific gravity until the material is frozen, and then separating the frozen material from the frigid liquid, said frigid liquid being constituted of trifluorotrichlorethylene and normal heptane mixed in proportions to provide the specified specific gravity.

2. The method of freezing liquid material by direct contact with a frigid liquid with which the said material is immiscible and comprsing the steps of feeding the liquid material into a body of the frigid liquid through which said material moves by virtue of a difference of the specific gravities of the material and frigid liquid, and limiting the rate of motion of said material through the frigid liquid by regulated preselection of the specific gravity of the frigid liquid in reference to that of said material by controlled admixture of liquid components of the frigid liquid which have specific gravities differing more than ten percent from one another so that the difference of the specific gravities of the frigid liquid and the liquid material is less than ten percent of the specific gravity of the frigid liquid at the normal operating temperature of the frigid liquid.

3. The method of freezing material by direct contact with a frigid liquid as defined in claim 2 and wherein one of said components has a specific gravity greater than one and the other of which components has a specific gravity of less than one.

4. The method of freezing liquid material by direct contact with a frigid liquid with which the said material is immiscible and comprising the steps of feeding the liquid material into a body of the frigid liquid through which said material moves by virtue of a difference of the specific gravities of the material and frigid liquid and limiting the rate of motion of said material through the frigid liquid by regulated preselection of the specific gravity of the frigid liquid in reference to that of said material by controlled admixture of liquid components of the frigid liquid, one of said components having a specific gravity greater than one, and another of said components having a specific gravity of less than one.

References Cited in the file of this patent

UNITED STATES PATENTS

| | | |
|---|---|---|
| 1,755,810 | Carney | Apr. 22, 1930 |
| 2,020,719 | Bottoms | Nov. 12, 1935 |
| 2,062,374 | Noel | Dec. 1, 1936 |
| 2,263,452 | Birdseye | Nov. 18, 1941 |
| 2,342,706 | Tankersley | Feb. 24, 1944 |
| 2,502,527 | McFarlan | Apr. 4, 1950 |

FOREIGN PATENTS

| | | |
|---|---|---|
| 178,013 | Switzerland | Sept. 2, 1935 |
| 912,999 | France | Aug. 26, 1946 |